United States Patent
Lin et al.

(10) Patent No.: US 9,706,182 B1
(45) Date of Patent: Jul. 11, 2017

(54) PROJECTION APPARATUS AND PROJECTION METHOD FOR OPTIMIZATION OF CONTRAST AND GRAYSCALE ACCURACY OF PROJECTED IMAGE

(71) Applicants: Himax Display, Inc., Tainan (TW); HIMAX TECHNOLOGIES LIMITED, Tainan (TW)

(72) Inventors: Chi-Wen Lin, Tainan (TW); Kuan-Hsu Fan-Chiang, Tainan (TW); Yuet-Wing Li, Tainan (TW); Mao-Jung Chung, Tainan (TW); Kuan-Chung Huang, Tainan (TW)

(73) Assignees: HIMAX DISPLAY, INC, Tainan (TW); HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/169,490

(22) Filed: May 31, 2016

(51) Int. Cl.
  H04N 5/74   (2006.01)
  H04N 9/31   (2006.01)

(52) U.S. Cl.
  CPC ......... H04N 9/3182 (2013.01); H04N 9/3197 (2013.01)

(58) Field of Classification Search
  None
  See application file for complete search history.

(56) References Cited

U.S. PATENT DOCUMENTS

| | | | |
|---|---|---|---|
| 9,323,039 B2* | 4/2016 | Chen | G02B 15/22 |
| 2007/0086624 A1* | 4/2007 | Breed | G06K 9/00362 |
| | | | 382/104 |
| 2008/0136763 A1* | 6/2008 | Ohashi | G09G 3/3611 |
| | | | 345/89 |
| 2010/0315594 A1* | 12/2010 | Johansson | A61B 3/024 |
| | | | 351/224 |
| 2011/0141157 A1* | 6/2011 | Hiroshima | G09G 3/3648 |
| | | | 345/690 |
| 2013/0016901 A1* | 1/2013 | Iwaki | H04N 1/407 |
| | | | 382/162 |
| 2015/0022569 A1* | 1/2015 | Iguchi | G09G 3/001 |
| | | | 345/697 |

FOREIGN PATENT DOCUMENTS

| | | |
|---|---|---|
| TW | 507096 | 10/2002 |
| TW | 201319719 | 5/2013 |

OTHER PUBLICATIONS

"Office Action of Taiwan Counterpart Application," issued on Mar. 16, 2017, p. 1-p. 7, in which the listed references were cited.

* cited by examiner

*Primary Examiner* — Paulos M Natnael
(74) *Attorney, Agent, or Firm* — J.C. Patents

(57) ABSTRACT

A projection apparatus and a projection method of the projection apparatus are provided. A control unit adjusts a grayscale characteristic of a light valve according to a temperature of the light valve, so as to improve a contrast and grayscale accuracy of a screen image.

8 Claims, 4 Drawing Sheets

PROJECTION APPARATUS AND PROJECTION METHOD FOR OPTIMIZATION OF CONTRAST AND GRAYSCALE ACCURACY OF PROJECTED IMAGE

FIELD OF INVENTION

The invention relates to a display apparatus; more particularly, the invention relates to a projection apparatus and an image optimization thereof.

DESCRIPTION OF RELATED ART

In the technical field of display apparatuses, various spatial light modulators are applied to convert illumination beams into image beams, and the display apparatuses may be transmissive liquid crystal display (LCD) panels, liquid-crystal-on-silicon (LCOS) panels, or digital micro mirror devices (DMD), for instance. The luminous efficacy of the transmissive LCD is lower than that of the LCD panel, and costs of the DMD are greater than those of the LCOS panel.

Generally, in a projector having the LCOS panel, the polarization beam is reflected to the LCOS panel. The LCOS panel modulates the polarization beam to another polarization beam in a different polarization state and reflects the same to a polarization splitter. The polarization splitter filters the polarization beam to generate an image beam, and the image beam is transmitted to an image-forming lens. The image-forming lens projects the image beam onto a screen, and images are then formed on the screen.

SUMMARY OF THE INVENTION

The invention is directed to a projection apparatus and a projection method thereof, so as to effectively improve display quality of projected images.

In an embodiment of the invention, a projection apparatus that includes a light valve, a lens, a temperature sensing unit, and a control unit is provided. The light valve reflects an illumination beam and converts the illumination beam into an image beam; The lens is arranged on a transmission path of the image beam, so as to project the image beam onto a screen and display a screen image on the screen. The temperature sensing unit senses a temperature of the light valve and generates a temperature sensing signal. The control unit is coupled to the temperature sensing unit and the light valve, and the control unit adjusts a grayscale characteristic of the light valve according to the temperature sensing signal, so as to improve a contrast and present correct grayscale of the screen image.

According to an embodiment of the invention, the control unit includes a storage unit and a micro controller unit. The storage unit stores a grayscale characteristic curve lookup table. The micro controller unit is coupled to the storage unit, the temperature sensing unit, and the light valve. The micro controller unit looks up the grayscale characteristic curve lookup table according to the temperature sensing signal to find a grayscale characteristic curve corresponding to the temperature sensing signal and controls the light valve to reflect the illumination beam according to the grayscale characteristic curve corresponding to the temperature sensing signal.

According to an embodiment of the invention, the light valve is a reflective LCOS panel, the grayscale characteristic curve is a gamma curve of the reflective LCOS panel, and the micro controller unit controls the reflective LCOS panel to display an image according to the gamma curve corresponding to the temperature sensing signal.

According to an embodiment of the invention, the control unit delays an adjustment of the grayscale characteristic of the light valve by a predetermined range of temperature when the temperature of the light valve drops.

According to an embodiment of the invention, the temperature sensing unit is embedded into the light valve.

In another embodiment of the invention, a projection method of a projection apparatus is provided. The projection apparatus includes a light valve, and the projection method includes following steps. An illumination beam is provided to the light valve, such that the light valve reflects the illumination beam and converts the illumination beam into an image beam. A lens arranged on a transmission path of the image beam is provided to project the image beam onto a screen and display a screen image on the screen. A temperature of the light valve is sensed, and a temperature sensing signal is generated. A grayscale characteristic of the light valve is adjusted according to the temperature sensing signal, so as to improve a contrast and grayscale accuracy of the screen image.

According to an embodiment of the invention, the projection method further includes following steps. A grayscale characteristic curve lookup table is looked up according to the temperature sensing signal, so as to find a grayscale characteristic curve corresponding to the temperature sensing signal. The light valve is controlled to reflect the illumination beam according to the grayscale characteristic curve corresponding to the temperature sensing signal, so as to improve the contrast and grayscale accuracy of the screen image.

According to an embodiment of the invention, the light valve is a reflective LCOS panel, the grayscale characteristic curve is a gamma curve of the reflective LCOS panel, and the projection method further includes: controlling the reflective LCOS panel to display an image according to the gamma curve corresponding to the temperature sensing signal.

According to an embodiment of the invention, the step of adjusting the grayscale characteristic of the light valve according to the temperature sensing signal further includes the following. It is determined whether the temperature of the light valve drops or not. If the temperature of the light valve drops, an adjustment of the grayscale characteristic of the light valve is delayed by a predetermined range of temperature. If the temperature of the light valve does not drop, the grayscale characteristic of the light valve is adjusted in response to a current temperature of the light valve.

According to an embodiment of the invention, the temperature of the light valve is sensed by a temperature sensing unit embedded into the light valve.

In view of the above, the grayscale characteristic of the light valve may be adjusted according to the temperature of the light valve, so as to improve the contrast and grayscale accuracy of the screen image and effectively enhance the display quality of the projected image.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings

DETAILED DESCRIPTION OF DISCLOSED EMBODIMENTS

Figure 1:
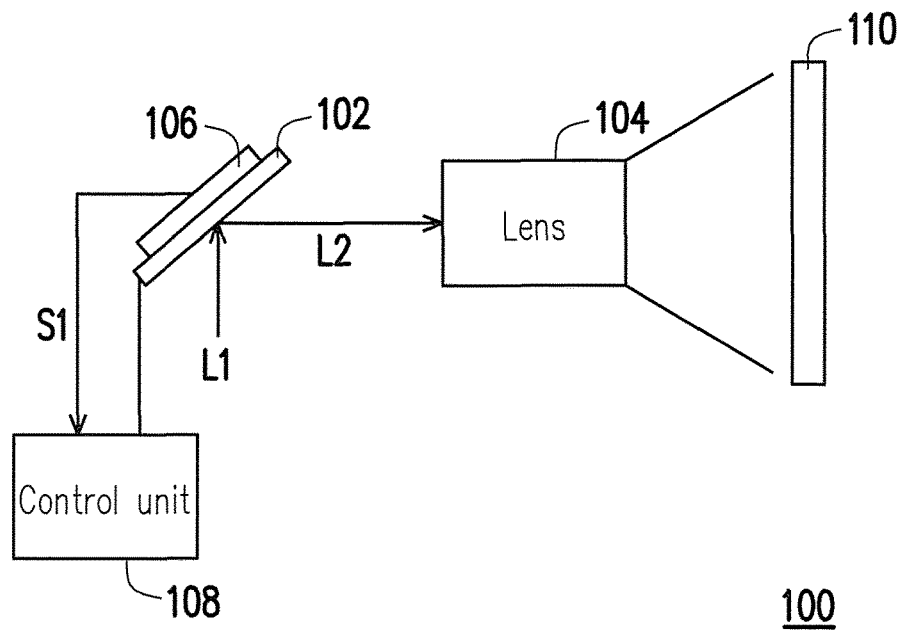
FIG. 1 is a schematic view illustrating a projection apparatus according to an embodiment of the invention.

FIG. 1 is a schematic view illustrating a projection apparatus according to an embodiment of the invention. The projection apparatus 100 includes a light valve 102, a lens 104, a temperature sensing unit 106, and a control unit 108 that is coupled to the light valve 102 and the temperature sensing unit 106. The light valve 102 may be configured to reflect an illumination beam L1 and convert the illumination beam L1 into an image beam L2. Here, the light valve 102 may be a DMD or a LCOS panel, which should however not be construed as a limitation to the invention. The lens 104 may be arranged on a transmission path of the image beam L2, so as to project the image beam L2 onto a screen 110 and display a screen image on the screen 110. The temperature sensing unit 106 may sense a temperature of the light valve 102 and generates a temperature sensing signal S1 to the control unit 108. The control unit 108 may adjust the grayscale characteristic of the light valve 102 according to the temperature sensing signal S1, so as to improve the contrast and grayscale accuracy of the screen image and effectively enhance the display quality of the screen image. Note that the temperature sensing unit 106 shown in FIG. 1 is arranged on the rear side of the light valve 102 and is closely attached to the light valve 102, so as to sense the temperature of the light valve 102. However, the invention is not limited thereto; in some embodiments, the temperature sensing unit 106 may also be embedded into the light valve 102.

Figure 2:
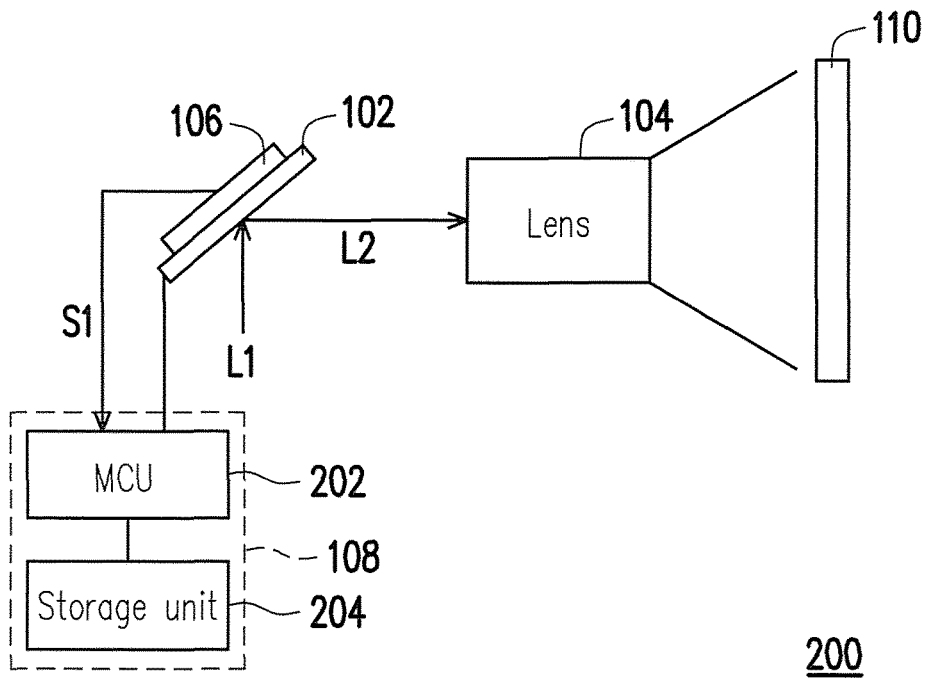
FIG. 2 is a schematic view illustrating a projection apparatus according to another embodiment of the invention.

FIG. 2 is a schematic view illustrating a projection apparatus according to another embodiment of the invention. In the present embodiment, the control unit 108 of the projection apparatus 200 may include a micro controller unit (MCU) 202 and a storage unit 204. The MCU 202 is coupled to the light valve 102, the temperature sensing unit 106, and the storage unit 204. The storage unit 204 is configured to store a grayscale characteristic curve lookup table of the light valve 102. The MCU 202 may look up the grayscale characteristic curve lookup table stored in the storage unit 204 according to the temperature sensing signal S1 obtained by the temperature sensing unit 102 through sensing the temperature of the light valve 102, so as to find a grayscale characteristic curve corresponding to the temperature sensing signal S1, i.e., the grayscale characteristic curve corresponding to the temperature of the light valve 102, and the MCU 202 controls the light valve 102 to reflect the illumination beam L1 according to the grayscale characteristic curve corresponding to the temperature sensing signal S1, so as to improve the contrast and grayscale accuracy of the screen image. For instance, the light valve 102 may be a reflective LCOS panel, the grayscale characteristic curve may be a gamma curve of the reflective LCOS panel, and the MCU 202 may control the reflective LCOS panel to display an image according to the gamma curve corresponding to the temperature sensing signal S1, so as to lessen the impact of the varying temperature of the light valve 102 on the image displayed on the screen 110 and improve the display quality of the displayed image.

When the control unit 108 (or the MCU 202) adjusts the grayscale characteristic of the light valve 102 according to the temperature sensing signal S1, and when the temperature of the light valve 102 increases, the grayscale characteristic of the light valve 102 is adjusted in response to the current temperature of the light valve 102; when the temperature of the light valve 102 drops, an adjustment of the grayscale characteristic of the light valve 102 is delayed by a predetermined range of temperature. For instance, the control unit 108 may update the gamma curve of the light valve 102 in unit of 5 degrees of temperature; when the temperature is being increased, and if the temperature of the light valve 102 reaches 35 degrees, the control unit 108 may update the gamma curve to be a gamma curve corresponding to 35 degrees; if the temperature of the light valve 102 reaches 40 degrees, the control unit 108 may update the gamma curve to be a gamma curve corresponding to 40 degrees. The rest can be deduced from the above and thus will not be further provided hereinafter. While the temperature is being dropped, e.g., if the temperature of the light valve 102 drops from 47 degrees to 45 degrees, the control unit 108 does not immediately update the gamma curve to be a gamma curve corresponding to 45 degrees; when the temperature of the light valve 102 drops to 40 degrees, the control unit 108 updates the gamma curve to be the gamma curve corresponding to 45 degrees. That is, the adjustment of the gamma curve is delayed after the temperature of the light valve 102 is decreased by a predetermined range of temperature (e.g., 5 degrees in the present embodiment, which should however not be construed as a limitation to the invention). The display quality of the screen image may be reduced due to frequent changes made to the grayscale characteristic curve of the light valve 102 by the control unit 108 when the temperature of the light valve 102 fluctuates around the setpoint (e.g., 46-47 degrees) at which the grayscale characteristic curve is adjusted, and this issue may be prevented by said delay of the adjustment of the grayscale characteristic curve.

Figure 3:
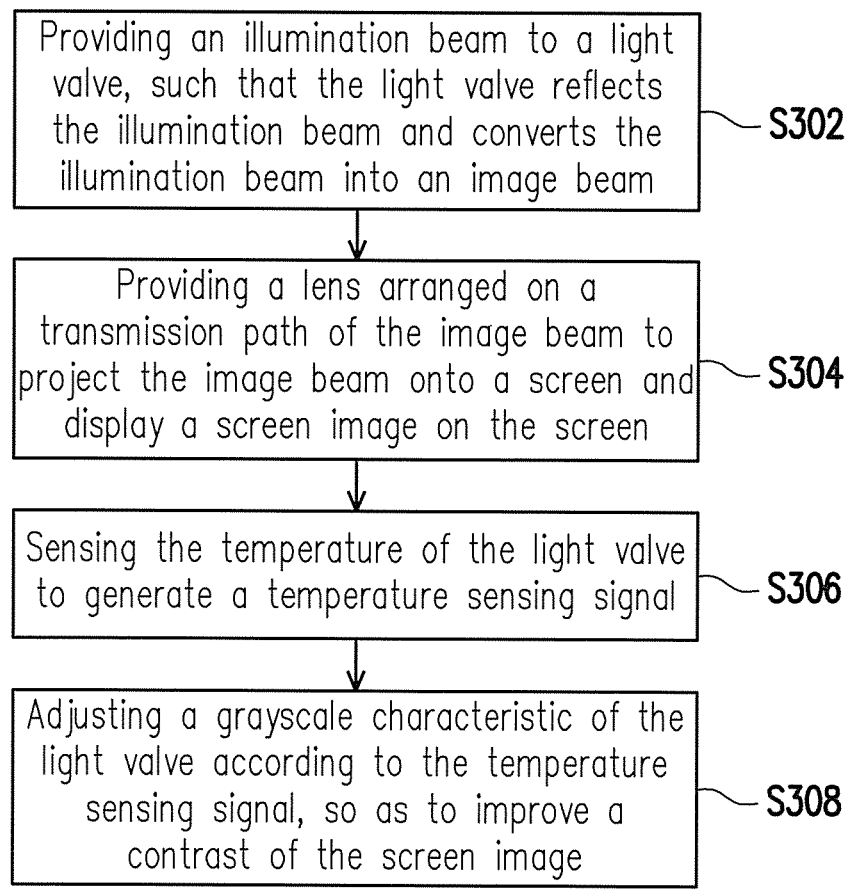
FIG. 3 is a schematic flowchart illustrating a projection method of a projection apparatus according to an embodiment of the invention.

FIG. 3 is a schematic flowchart illustrating a projection method of a projection apparatus according to an embodiment of the invention. As shown in FIG. 3, the projection method of the projection apparatus (provided in the previous embodiments) may include following steps. In step S302, an illumination beam is provided to a light valve of the projection apparatus, such that the light valve reflects the illumination beam and converts the illumination beam into an image beam. The light valve 102 includes but is not limited to a DMD or a LCOS panel. A lens arranged on a transmission path of the image beam is provided to project the image beam onto a screen and display a screen image on the screen (step S304). The temperature of the light valve is sensed to generate a temperature sensing signal in step S306. Here, the temperature of the valve may be sensed by a temperature sensing unit that is embedded into the light valve, for instance. The grayscale characteristic of the light valve is adjusted according to the temperature sensing signal, so as to improve a contrast and grayscale accuracy of the screen image (step S308) and further enhance the display quality of the screen image.

Figure 4:
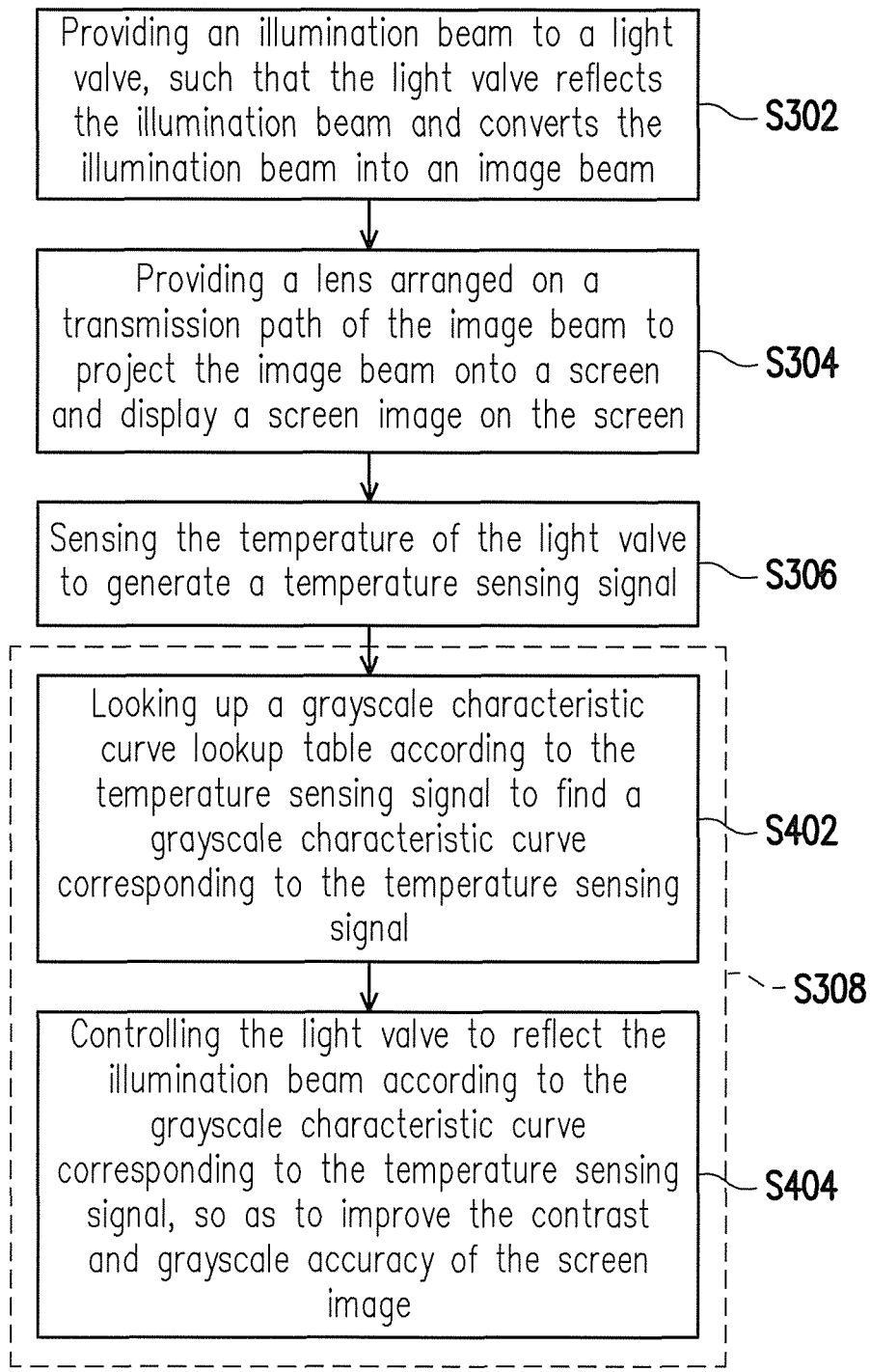
FIG. 4 is a schematic flowchart illustrating a projection method of a projection apparatus according to another embodiment of the invention.

FIG. 4 is a schematic flowchart illustrating a projection method of a projection apparatus according to another embodiment of the invention. The difference between the embodiment depicted in FIG. 3 and the present embodiment lies in that step S308 provided in the present embodiment may include steps S402 and S404. That is, after the temperature of the valve is sensed to obtain the temperature sensing signal, a grayscale characteristic curve lookup table is looked up according to the temperature sensing signal to find a grayscale characteristic curve corresponding to the temperature sensing signal (step S402), and the light valve is controlled to reflect the illumination beam according to the grayscale characteristic curve corresponding to the temperature sensing signal, so as to improve the contrast and grayscale accuracy of the screen image (step S404). For instance, the light valve may be a reflective LCOS panel, the grayscale characteristic curve may be a gamma curve of the reflective LCOS panel, and the grayscale characteristic may be adjusted by controlling the reflective LCOS panel to display an image according to the gamma curve corresponding to the temperature sensing signal, so as to lessen the impact of the varying temperature of the light valve on the image displayed on the screen and improve the display quality of the displayed image.

Figure 5:
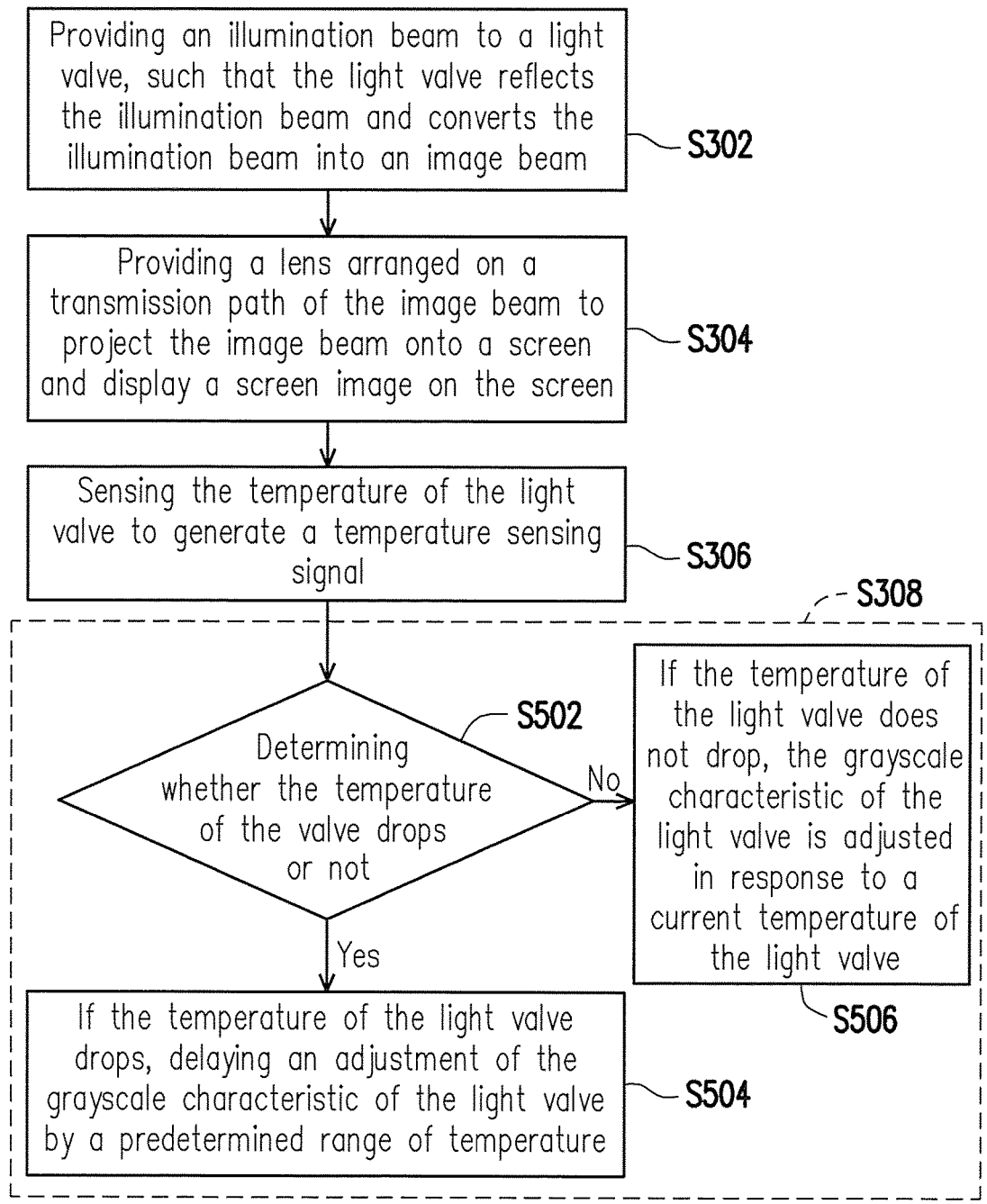
FIG. 5 is a schematic flowchart illustrating a projection method of a projection apparatus according to another embodiment of the invention.

FIG. 5 is a schematic flowchart illustrating a projection method of a projection apparatus according to another embodiment of the invention. In the present embodiment, the step S308 of adjusting the grayscale characteristic of the light valve may include steps S502-S504. That is, it is determined whether the temperature of the light valve drops or not in step S502; if the temperature of the light valve drops, an adjustment of the grayscale characteristic of the light valve is delayed by a predetermined range of temperature (step S504), and if the temperature of the light valve does not drop, the grayscale characteristic of the light valve is adjusted in response to a current temperature of the light valve (step S506). The display quality of the screen image may be reduced due to frequent changes made to the grayscale characteristic curve of the light valve by the control unit when the temperature of the light valve fluctuates around the setpoint at which the grayscale characteristic curve is adjusted, and this issue may be prevented by said delay of the adjustment of the grayscale characteristic curve.

To sum up, in the embodiments of the invention, the grayscale characteristic of the light valve may be adjusted according to the temperature of the light valve, so as to improve the contrast and grayscale accuracy of the screen image and effectively enhance the display quality of the projected image. In some embodiments, it is likely to delay the adjustment of the grayscale characteristic curve of the light valve by a predetermined range of temperature when the temperature of the light valve drops. Note that the display quality of the screen image may be reduced due to frequent changes made to the grayscale characteristic curve of the light valve by the control unit when the temperature of the light valve fluctuates around the setpoint at which the grayscale characteristic curve is adjusted, and this issue may be prevented by said delay of the adjustment of the grayscale characteristic curve.

What is claimed is:
1. A projection apparatus comprising:
    a light valve reflecting an illumination beam and converting the illumination beam into an image beam;
    a lens arranged on a transmission path of the image beam, so as to project the image beam onto a screen and display a screen image on the screen;
    a temperature sensing unit sensing a temperature of the light valve and generating a temperature sensing signal; and
    a control unit coupled to the temperature sensing unit and the light valve, the control unit adjusting a grayscale characteristic of the light valve according to the temperature sensing signal, so as to improve a contrast and grayscale accuracy of the screen image, wherein the control unit comprises:
    a storage unit storing a grayscale characteristic curve lookup table; and
    a micro controller unit coupled to the storage unit, the temperature sensing unit, and the light valve, the micro controller unit looking up the grayscale characteristic curve lookup table according to the temperature sensing signal to find a grayscale characteristic curve corresponding to the temperature sensing signal and controlling the light valve to reflect the illumination beam according to the grayscale characteristic curve corresponding to the temperature sensing signal.

2. The projection apparatus of claim 1, wherein the light valve is a reflective liquid-crystal-on-silicon panel, the grayscale characteristic curve is a gamma curve of the reflective liquid-crystal-on-silicon panel, and the micro controller unit controls the reflective liquid-crystal-on-silicon panel to display an image according to the gamma curve corresponding to the temperature sensing signal.

3. The projection apparatus of claim 1, wherein the control unit delays an adjustment of the grayscale characteristic of the light valve by a predetermined range of temperature when the temperature of the light valve drops.

4. The projection apparatus of claim 1, wherein the temperature sensing unit is embedded into the light valve.

5. A projection method of a projection apparatus, the projection apparatus comprising a light valve, the projection method comprising:
    providing an illumination beam to the light valve, such that the light valve reflects the illumination beam and converts the illumination beam into an image beam;
    providing a lens arranged on a transmission path of the image beam to project the image beam onto a screen and display a screen image on the screen;
    sensing a temperature of the light valve and generating a temperature sensing signal; and
    adjusting a grayscale characteristic of the light valve according to the temperature sensing signal, so as to improve a contrast and grayscale accuracy of the screen image, wherein the step of adjusting the grayscale characteristic of the light valve according to the temperature sensing signal comprises:
    looking up a grayscale characteristic curve lookup table according to the temperature sensing signal, so as to find a grayscale characteristic curve corresponding to the temperature sensing signal; and
    controlling the light valve to reflect the illumination beam according to the grayscale characteristic curve corresponding to the temperature sensing signal, so as to improve the contrast and grayscale accuracy of the screen image.

6. The projection method of claim 5, wherein the light valve is a reflective liquid-crystal-on-silicon panel, the grayscale characteristic curve is a gamma curve of the reflective liquid-crystal-on-silicon panel, and the projection method further comprises:

controlling the reflective liquid-crystal-on-silicon panel to display an image according to the gamma curve corresponding to the temperature sensing signal.

7. The projection method of claim 5, wherein the step of adjusting the grayscale characteristic of the light valve according to the temperature sensing signal comprises:
determining whether the temperature of the light valve drops or not;
if the temperature of the light valve drops, delaying an adjustment of the grayscale characteristic of the light valve by a predetermined range of temperature; and
if the temperature of the light valve does not drop, adjusting the grayscale characteristic of the light valve in response to a current temperature of the light valve.

8. The projection method of claim 5, wherein the temperature of the light valve is sensed by a temperature sensing unit embedded into the light valve.

* * * * *